July 8, 1958     R. TOADER     2,842,491
OZONE AIR PURIFIER
Filed April 27, 1956
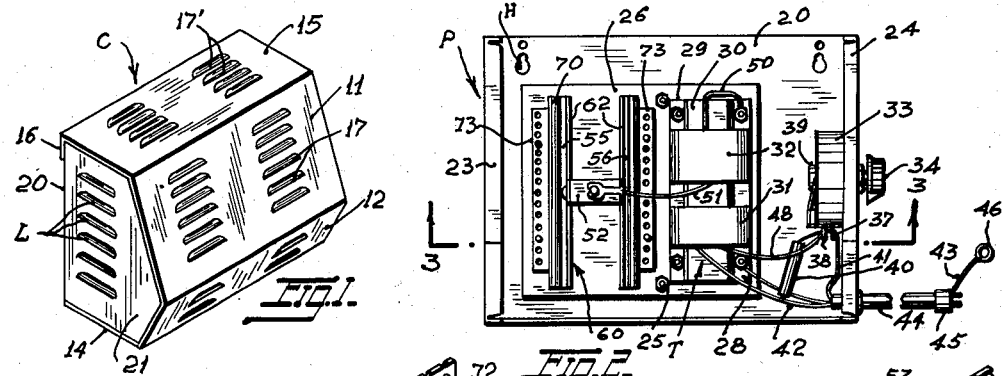
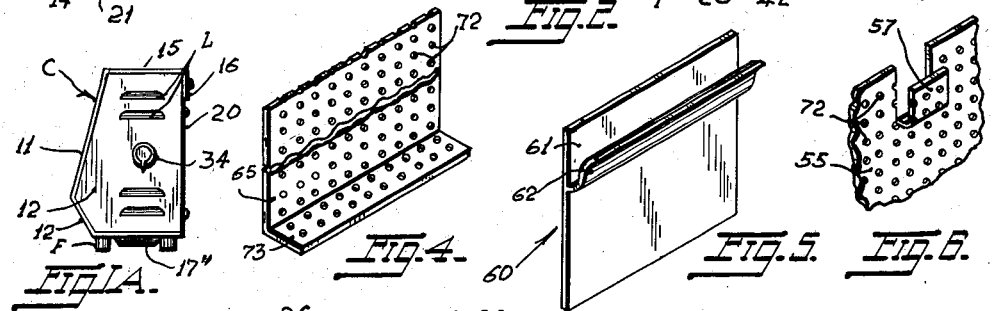
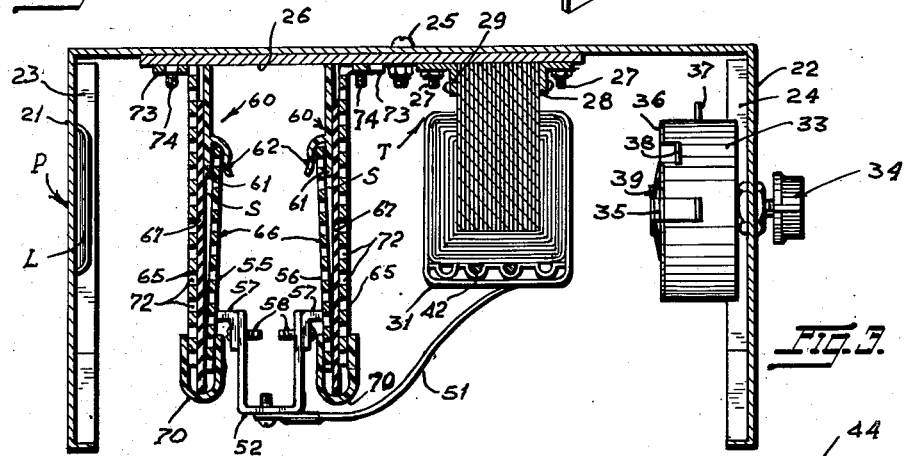
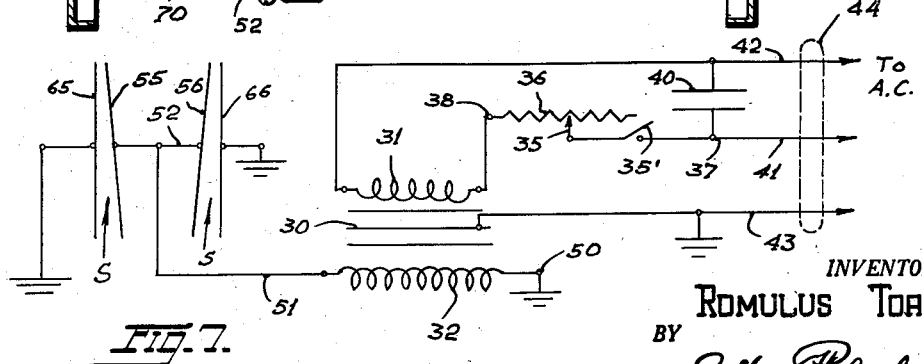
INVENTOR.
ROMULUS TOADER
BY
*ATTORNEY*

United States Patent Office 2,842,491
Patented July 8, 1958

2,842,491

OZONE AIR PURIFIER

Romulus Toader, New York, N. Y., assignor to Royal Industries, Inc., Springfield, Ohio, a corporation of Ohio Application April 27, 1956, Serial No. 581,067

1 Claim. (Cl. 204—317)

This invention relates to ozone generators and, more particularly, has reference to a device of this type so arranged that it provides a maximum generation of ozone in relation to the amount of electrical energy used for generating the ozone.

A principal object of the present invention is to provide an ozone generating device wherein a particular spacing of the electrodes is used in the device to increase efficiency of ozone generation.

A further object of importance is to provide a portable ozone generating device that will be capable of manufacture at relatively low cost; that will permit a wide range of adjustments in respect to the amount of power supplied to the electrodes thereof, and in respect to the rate of ozone generation; that will be compact, have relatively simple circuitry, and will provide ready accessibility to the component parts thereof.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a persepective view of the casing housing the device according to the invention.

Fig. 1A is an end view of the casing.

Fig. 2 is a front elevational view of the device with the cover of the casing removed.

Fig. 3 is a sectional view taken on lines 3—3 of Fig. 2.

Fig. 4 is a perspective view of an electrode plate employed in the device.

Fig. 5 is a perspective view of an electrode support member.

Fig. 6 is a fragmentary perspective view of an electrode plate.

Fig. 7 is a circuit diagram of the electrical system employed in the device.

The casing 10 of the device as shown in Figs. 1 and 1A is generally rectangular with a sloping front portion 11 inclined upwards and an adjoining sloping front portion 12 inclined downwards. The cover C of the casing is formed of a folded flat sheet of metal. The cover includes the sloping front portions 11, 12, a flat bottom 14, a flat top 15 and a top rear depending flange 16. The cover has horizontal louvers 17, 17' and 17" on front, top, and bottom respectively. The louvers are formed by pressed or struck out portions of the metal sheet material.

In Figs. 2 and 3 the device is shown with the cover C removed to expose internal parts. The body of the device has a sheet metal member P bent to form part of the walls of the casing. This portion of the casing includes the flat rear plate 20 and the perpendicularly disposed side plates 21, 22. The side plates have louvers L. Flanges 23, 24 are formed perpendicular to the side plates at their front edges and serve as supports for the front cover plates 11 and 12. Within this folded plate member P are enclosed the several working electrical parts of the device.

A flat metal plate 26 is secured to rear plate 20 by screws 25. Secured to plate 26 by suitable bolts 27 are a pair of angle plates 28 and 29. Attached to these angle plates is a high voltage step-up transformer T having a laminated rectangular iron core 30 on which are wound primary coil 31 and secondary coil 32. A wire wound variable resistor or rheostat 33 is mounted on side plate 22. The resistor is adjusted by knob 34 mounted on the shaft of the resistor outside of the casing 10. The resistor has a sliding contact 35 which slides over the exposed portion of the wire winding 36 of the resistor. The resistor has protruding contact fingers 37, 38. To contact 37 are secured one end of capacitor 40 and the end of power wire 41. Wires 41, 42, and ground lead 43 are enclosed in power cable 44 which is terminated by a plug 45. The ground lead 43 extends outside the plug and terminates in a lug 46. Ground lead 43 is connected to angle plate 28 which grounds the core 30 of the transformer. Wire 42 is connected to one end of primary coil 31. The other end of the primary coil is connected to contact 38 via a lead 48. The resistor winding 36 terminates in the contact finger 38 and sliding contact 35 terminates in contact 37.

One end 50 of the secondary winding 32 is grounded to angle plate 28. The other end of the secondary winding is connected via lead wire 51 to bridge member 52. The bridge member is a generally U-shaped strip of metal which is secured to the foraminous electrode plates 55 and 56. Each of these plates has a struck out tongue or flap 57 as best shown in Figs. 3 and 6. The flaps are attached to the bridge member 52 by screws 58. The electrodes 55 and 56 have their rear edges inserted in plastic insulating spacer members 60. These spacer members as best shown in Fig. 5 have an elongated flat wall 61 from which extends a curved portion 62 to form a groove or trough in which the end of an electrode may be seated.

Electrodes 65 and 66 are disposed adjacent electrodes 55 and 56, respectively. A mica sheet 67 is disposed between each pair of electrodes. The plastic members 60 are provided so that electrodes 55 and 56 may be angularly disposed to the flat electrodes 65 and 66, respectively. The tapered spaces S between the electrodes are wedge-shaped cavities which are widest at the ends of walls 61 and taper to zero width where the mica sheets abut the ends of the electrodes. A plastic insulation hood member 70, which is generally U-shaped in cross section, is mounted over the ends of each pair of electrodes and the protruding end of the mica sheet 67. The several electrodes are each formed from a flat sheet of metal having apertures 72 as shown in Figs. 3, 4 and 6. Electrodes 65 and 66 each have a bent flanged pedestal end 73 which is secured to the plate 26 by screws 74. The electrodes 65 and 66 are thus grounded, while electrodes 55 and 56 are connected electrically to the secondary winding 32.

In Fig. 7 is shown schematically the electrical circuit of the device. Capacitor 40 is connected across power input lead wires 41 and 42. A switch 35' is incorporated in the housing of resistor 33 and is ganged to the rotor shaft 39 so that the resistor element 36 is set at maximum resistance just before the switch is closed or opened. The resistance element 36 is in series with primary winding 31. Thus the power input to the transformer is readily controlled by means of adjustment knob 34. The secondary winding 32 of the transformer is connected across the parallel arrangement of the electrode pairs 55, 65 and 56, 66. The connection of electrodes 65 and 66 is to ground through plate 26 and is common to the electrical connection of the grounded end 50 of the secondary winding.

In operation, the louvers in the top, bottom, sides and front of the casing insure free circulation of air therethrough. Alternating current power is supplied to the ozone generating device via cable 44. When the resistor 33 is turned on a high alternating voltage is applied across the two ozone generator units which include electrodes 55, 65 and 56, 66. As the slider 35 is adjusted a corona discharge field develops between each electrode and its adjacent electrode. The maximum electric discharge takes place between lines having optimum spacing of the electrodes for the particular voltage applied, humidity of the air in cavities S, and other ambient conditions. The electrical discharge ionizes the air circulating through the cavities S and generates ozone thereby. Two hundred or more milligrams of ozone per hour can be generated by the device described, depending on the number and size of the electrode pairs, intensity of applied voltage, etc.

The present device is arranged as a portable apparatus for use in homes, offices, hospitals, factories, laboratories, and similar places where deodorizing and purification of air by ionization and generation of ozone is desired. If desired, the device may be mounted in a stationary position on a flat surface and for this purpose the mounting feet F shown in Fig. 1A are provided. The device may also be hung in an elevated position on a wall or partition and for this purpose the elongated apertures H shown in Fig. 2 on the rear plate 20 are provided. If desired, an electric fan can be mounted in or near the device to increase the circulation of air through the casing.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

An ozone generator device, comprising a generally rectangular hollow sheet metal casing, said casing having a removable cover for the bottom, front and top thereof, and a bent plate forming sides and rear thereof, said sides and cover having a plurality of louvers therein to permit a free flow of air through the casing; a flat conductive plate secured to the rear of the casing, a plurality of pairs of electrodes secured to said flat plate; each pair of electrodes having a flat sheet of insulating material disposed therebetween, an insulating spacer having a groove therein disposed between the flat sheet and one inclined electrode of said pair of electrodes with an edge of the inclined electrode being disposed in the groove to define a wedge-shaped cavity between adjacent electrodes of said pair of electrodes, each of said electrodes being formed from a substantially flat apertured metal sheet, an electrical bridge member connecting the inclined electrodes of the pairs of electrodes, the other electrode of each of said pairs being grounded through said flat conductive plate; a transformer having a laminated iron core secured to said flat conductive plate, primary and secondary coils wound on said core; a capacitor, and an electrical cable enclosing three lead wires extending through one side of the casing, said capacitor being connected across two of said lead wires, one of the two lead wires being connected to one end of said primary coil, the other of the two lead wires being connected to the other end of said primary coil one end of said secondary coil being connected to said inclined electrodes through said electrical bridge member, the other end of said secondary coil and the third wire of the three lead wires being grounded to said flat conductive plate.

References Cited in the file of this patent
UNITED STATES PATENTS

| | | |
|---|---|---|
| 996,850 | Guiley | July 4, 1911 |
| 1,743,202 | Forrest | Jan. 14, 1930 |
| 1,965,187 | Hartman | July 3, 1934 |
| 2,113,913 | Cragun | Apr. 12, 1938 |
| 2,140,618 | Conley | Dec. 20, 1938 |
| 2,260,831 | Daily | Oct. 28, 1941 |

FOREIGN PATENTS

| | | |
|---|---|---|
| 233,418 | Great Britain | May 6, 1925 |